METHOD OF OPERATING A FUEL CELL SYSTEM
Filed Dec. 20, 1961
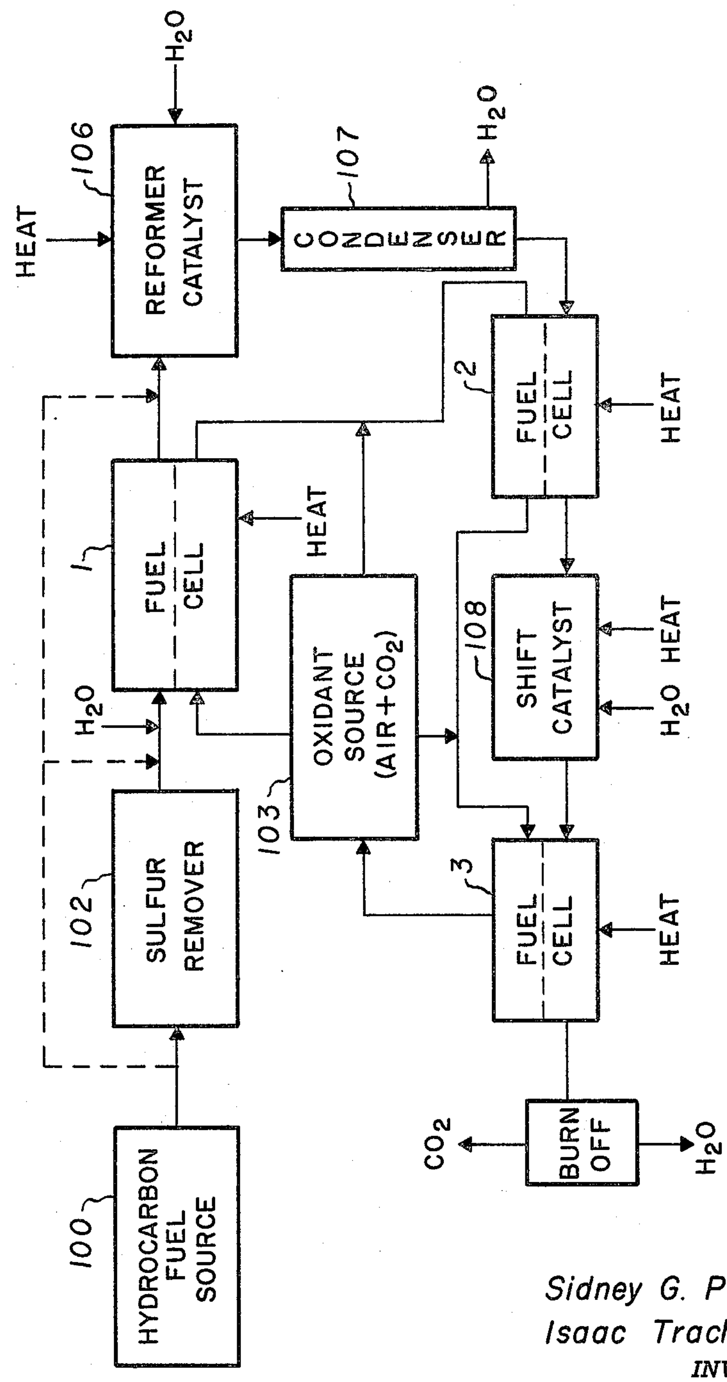
Sidney G. Parker
Isaac Trachtenberg
INVENTOR.
BY Robert C Peterson
Attorney United States Patent Office 3,266,938
Patented August 16, 1966

1

3,266,938

METHOD OF OPERATING A FUEL CELL SYSTEM

Sidney G. Parker and Isaac Trachtenberg, Dallas, Tex., assignors to Texas Instruments Incorporated, Dallas, Tex., a corporation of Delaware Filed Dec. 20, 1961, Ser. No. 160,721
6 Claims. (Cl. 136—86)

This invention relates to a fuel cell system and method of generating electrical power therefrom, and more particularly to such a system utilizing hydrocarbons and products thereof as the fuel.

In general, fuel cells require a fuel electrode and an oxidant electrode separated by an electrolyte. In hydrocarbon or hydrogen-type fuel cells, a hydrocarbon gas is made to contact the fuel electrode and the electrolyte concurrently, while air is made to contact the oxidant electrode and electrolyte concurrently. As a result of electrochemical reactions, an electromotive force is generated which will produce a current flow between the electrodes through an external circuit.

Inherently, fuel cells are inefficient, only a low percent of the energy of a hydrocarbon fuel being converted into useful electricity, for example 5% of the energy in kerosene. Hence to improve the conversion of chemical to electrical power, various fuel cell systems have been devised to make the best utilization of fuel and oxidant, the most common being an arrangement of a plurality of cells in which a suitable hydrocarbon vapor is passed into the fuel chamber of one cell with the exit gases from said chamber serving as feed gases for the fuel chamber of the second cell. In the process of converting the thermal energy in the hydrocarbon into electricity by the chemical action of the cell, the hydrocarbon, if the cell were perfectly efficient, would be resolved substantially into water and carbon dioxide. It is believed, however, that in passing the hydrocarbon through no more than one fuel cell, only part of the hydrogen in the hydrocarbon is stripped off and used, and it is doubtful that the hydrocarbon is oxidized down to carbon dioxide and water.

In order to utilize fully the energy of the hydrocarbon fuel in a system of fuel cells, the invention contemplates a system comprising a number of fuel cells and a plurality of external catalysts, the latter being so arranged that the unspent fuel from a cell is fed into a catalyst unit where, by the aid of water vapor injected into the catalyst unit, the fuel is resolved into carbon monoxide and hydrogen, the succeeding cell in the system operating at much higher power output on hydrogen than it would on hydrocarbons.

It is therefore an object of the present invention to provide a fuel cell system for the maximum utilization of hydrocarbon fuel in generating electrical power by the aid of external catalysts;

It is another object of the invention to provide a method of operating a fuel cell system for generating electrical power by introducing an oxidant into a series of fuel cells and a hydrocarbon vapor into the first fuel cell, reforming the effluent fuel therein to carbon monoxide and hydrogen, introducing said carbon monoxide and hydrogen as fuel into a second fuel cell, and converting the effluent fuel from the second fuel cell to carbon dioxide and hydrogen by reacting the fuel with water;

It is a further object of the invention to provide a method of generating electrical power from a fuel cell system by introducing hydrocarbons and an oxidant into a first fuel cell, reforming the spent hydrocarbon with water to carbon monoxide and hydrogen, introducing the fuel gas as reformed and an oxidant into a second fuel cell, converting the spent fuel from the second fuel cell containing carbon monoxide to carbon dioxide and hydrogen and introducing an oxidant and the converted spent fuel into a third fuel cell, thereafter burning the spent fuel to supply heat in the various units;

2

Other objects and advantages of the method of this invention will become apparent from the following description when taken in conjunction with the appended claims and attached drawing in which the sole figure is a flow block diagram illustrating the fuel cell system of the invention.

Referring now to the drawing, a series of fuel cells 1, 2, 3 are provided by way of example. The fuel cells may be any of the well-known high temperature type which operate on an oxidant and a hydrocarbon or hydrogen fuel. Hydrocarbon fuel, which may be a gaseous fuel or vapors thereof entrained in an inert carrier gas such as nitrogen, for example, is introduced to the fuel side of a first fuel cell 1 from the source 100, the fuel side of the first fuel cell 1 being indicated in the drawing by the entry point on the left above the broken line in the box designating fuel cell 1. The fuel entry point is indicated in the drawing on the right and below the broken line in the boxes designated fuel cell 2 and fuel cell 3. If sulphur is present in the fuel vapors, it may be removed by passing the fuel over a heated bed of iron filings or through other known sulphur removers 102.

Five unit volumes of air and $CO_2$ in a 5 to 1 ratio by volume for every unit volume of fuel are introduced into the oxidant side of the fuel cell from the oxidant source 103, the oxidant side of the first fuel cell 1 being indicated in the drawing by the entry point on the left below the broken line in the box designated a fuel cell 1. The oxidant side of each of the fuel cells 2 and 3 is indicated in the drawing by the entry points on the right above the broken lines in the boxes labeled fuel cell 1 and fuel cell 2. The first fuel cell 1 may have any number of fuel electrodes and oxidant electrodes, but for best utilization it should contain, as a minimum, dual fuel and oxidant electrodes serially arranged. The first fuel cell is appropriately heated by heat supplied as indicated to a temperature sufficient for fuel cell operation. Usually, the temperature is between 400° C. and 700° C. At this point water may be injected as indicated into the fuel side of the first cell 1 in the amount of 5 to 10% by volume of fuel, which will provide a reaction between the water and the fuel, generating some hydrogen (which is a more useful form of fuel) and carbon monoxide. The exit fuel gas from the first fuel cell 1 (including the hydrogen and carbon monoxide generated therein) is then passed into a reformer catalyst chamber 106, said chamber containing any well-known catalyst to convert hydrocarbon fuel to carbon monoxide and hydrogen. Various well-known nickel catalysts are acceptable. One suitable nickel catalyst, by way of example, is sold under the trade name G–56 by Girdler Catalysts, Chemical Products Division, Chemtron Corporation, Louisville 1, Kentucky. Water vapor in an amount of 50% in excess of the stoichiometric quantity required to react with the hydrocarbon is passed into the reformer unit 106. The unit is operated at a temperature between 550° C. and 1100° C. under any pressure between atmospheric and 320 p.s.i.g. In the reformer unit, the hydrocarbon is converted to carbon monoxide and hydrogen, the excess water being removed from the fuel gas stream by a condenser 107, leaving carbon monoxide and hydrogen in the fuel stream. The fuel is then passed into a second fuel cell 2, which is similar in design and construction to the first fuel cell, heat being supplied thereto as indicated. The exhaust fuel gas from the second fuel cell 2, which is substantially carbon monoxide, is introduced into the shift catalyst unit 108. This catalyst may be any of the well-known shift catalysts such as a chromium promoted iron catalyst, for example, one form of which may be obtained under the trade name G–3A or G–3B from Girdler Catalysts, Chemical Products Division, Chemtron Corporation, Louisville 1, Kentucky.

In the shift catalyst unit 108, with water vapor injected therein as indicated and the unit maintained at a temperature between about 300° C. and 500° C., the carbon monoxide is "shifted," or converted, to carbon dioxide, hydrogen being liberated.

The fuel gas, which now contains carbon dioxide and hydrogen, is introduced into a third fuel cell unit 3 which may be similar to the first and second fuel cell units, or may be a multiple series of fuel cells. The fuel gases discharged from the third fuel cell 3, if not totally consumed into unuseable products, may be utilized to supply the necessary heat involved in the process. Also, if the effluent spent fuel is substantially carbon dioxide and contains very little hydrogen, the hydrogen may be burned off and the carbon dioxide used in the oxidant electrode chamber of the fuel cells.

The above process provides a more complete conversion of hydrocarbons to electricity than other methods inasmuch as the hydrocarbon fuel is converted with water to hydrogen and carbon monoxide, and then the carbon monoxide is converted with water to carbon dioxide, liberating more hydrogen.

The electrical terminals of the different fuel cells may be connected in the conventional manner, in series or in parallel, depending upon whether high voltage or high amperage is desired, respectively.

It should be appreciated that if the hydrocarbon is a paraffin or olefin derivative, the first fuel cell would advantageously be excluded inasmuch as these hydrocarbons tend to decrease the efficiency of a fuel cell. Such hydrocarbon could be applied directly to the reformer catalyst 106. If naphthenic hydrocarbons are used, the first fuel cell may be advantageously employed, providing dehydrogenation of the hydrocarbon.

Various modifications and changes of the above process will be readily apparent to those skilled in the art and such changes and modifications are within the scope of the invention as defined in the appended claims.

What is claimed is:

1. The method of generating electrical power from a fuel cell system comprising the steps of (a) passing a gaseous hydrocarbon material into the fuel electrode side and a gaseous oxidant-bearing material into the oxidant electrode side of a first fuel cell maintained at a temperature sufficient for fuel cell operation to promote the generation of electrical energy in said first fuel cell;

(b) passing the spent gaseous hydrocarbon material from said first fuel cell into a reformer catalyst unit;

(c) reacting the spent hydrocarbon material from said first fuel cell with water in said reformer catalyst unit to generate carbon monoxide and hydrogen;

(d) removing excess water from the effluent carbon monoxide and hydrogen from said reformer catalyst unit;

(e) passing the carbon monoxide and hydrogen from said reformer catalyst unit into the fuel electrode side of a second fuel cell and passing oxidant-bearing material into the oxidant electrode side of said second fuel cell while maintaining said second fuel cell at a temperature sufficient for fuel cell operation to promote the generation of electrical power in said second fuel cell;

(f) passing spent fuel from said second fuel cell into a shift catalyst chamber;

(g) reacting said spent fuel from said second fuel cell with water in said shift catalyst chamber to convert the carbon monoxide to carbon dioxide and liberate hydrogen; and (h) introducing the hydrogen and carbon dioxide generated in the shift catalyst unit into the fuel side of a third fuel cell and passing oxidant-bearing material into the oxidant electrode side of said third fuel cell while maintaining said third fuel cell at a temperature sufficient to promote the generation of electrical power in said third fuel cell.

2. The method of claim 1 wherein the reacting of spent hydrocarbon material is between 550° C. and 1100° C.

3. The method of claim 2 wherein the reacting of spent fuel from said second fuel cell is performed at a temperature between about 300° C. and 500° C.

4. In a method of operating a fuel cell system comprising introducing hydrocarbon fuel and an oxidant and carbon dioxide into a first fuel cell, the improvement comprising the steps of (a) reforming the effluent fuel from said first fuel cell to carbon monoxide and hydrogen;

(b) introducing said reformed fuel into a second fuel cell;

(c) converting the effluent fuel from said second fuel cell to carbon dioxide and hydrogen reaction products with water in the presence of a shift catalyst; and (d) introducing said reaction products from the shift catalyst unit into the fuel side of a third fuel cell.

5. In the method of operating a fuel cell system comprising introducing gaseous hydrocarbon fuel and an oxidant comprising air and carbon dioxide into a first fuel cell, the improvement comprising the steps of (a) reforming said gaseous hydrocarbon fuel in the presence of water and a nickel catalyst to hydrogen and carbon monoxide;

(b) introducing the reformed fuel into said first fuel cell;

(c) reacting the effluent fuel from said first fuel cell in the presence of a shift catalyst and water to produce carbon dioxide and hydrogen; and (d) passing said hydrogen and carbon dioxide prouced from the effluent fuel from said first fuel cell into a second fuel cell.

6. The method of claim 5 wherein the fuel cells are maintained at a temperature between 400° C. and 700° C.

References Cited by the Examiner

UNITED STATES PATENTS

| | | | |
|---|---|---|---|
| 411,426 | 9/1889 | Dahl | 136—86 |
| 2,384,463 | 9/1945 | Gunn et al. | 136—86 |
| 3,141,796 | 7/1964 | Fay et al. | 136—86 |
| 3,146,131 | 8/1964 | Linden et al. | 136—86 |
| 3,148,089 | 9/1964 | Oswin | 136—86 |

WINSTON A. DOUGLAS, *Primary Examiner.*

JOHN R. SPECK, *Examiner.*

H. FEELEY, *Assistant Examiner.*